(12) United States Patent
Miyamoto

(10) Patent No.: US 8,496,510 B2
(45) Date of Patent: Jul. 30, 2013

(54) METHOD OF PRODUCING RETREAD TIRE AND GRINDING APPARATUS FOR USED TIRE

(75) Inventor: Kazuyuki Miyamoto, Nasushiobara (JP)

(73) Assignee: Bridgestone Corporation, Tokyo (JP)

( * ) Notice: Subject to any disclaimer, the term of this patent is extended or adjusted under 35 U.S.C. 154(b) by 252 days.

(21) Appl. No.: 13/058,382

(22) PCT Filed: Jul. 16, 2009

(86) PCT No.: PCT/JP2009/062919
§ 371 (c)(1),
(2), (4) Date: Feb. 10, 2011

(87) PCT Pub. No.: WO2010/018735
PCT Pub. Date: Feb. 18, 2010

(65) Prior Publication Data
US 2011/0143637 A1    Jun. 16, 2011

(30) Foreign Application Priority Data

Aug. 11, 2008  (JP) ................................. 2008-206680

(51) Int. Cl.
*B24B 49/00* (2012.01)
*B24B 19/22* (2006.01)

(52) U.S. Cl.
USPC ............................................................ 451/5

(58) Field of Classification Search
USPC ............................. 451/5, 8, 9, 10, 49, 246, 28
See application file for complete search history.

(56) References Cited

FOREIGN PATENT DOCUMENTS

| JP | 58-001546 A | 1/1983 |
|---|---|---|
| JP | 5-126687 A | 5/1993 |
| JP | 2002-086586 A | 3/2002 |
| JP | 2003-510188 A | 3/2003 |
| JP | 2007-111896 A | 5/2007 |
| JP | 2007-326275 A | 12/2007 |

OTHER PUBLICATIONS

International Search Report issued in PCT/JP2009/062919 dated Oct. 6, 2009 (2 pages).
Japanese Office Action, dated Dec. 18, 2012, issued in corresponding Japanese Application No. 2008-206680.
Chinese Office Action, dated Mar. 25, 2013, issued in corresponding Chinese Application No. 200980140115.8.
Japanese Decision of Refusal, dated May 7, 2013, issued in corresponding Japanese Patent Application No. 2008-206680.

*Primary Examiner* — Robert Rose
(74) *Attorney, Agent, or Firm* — Sughrue Mion, PLLC

(57) ABSTRACT

An object of the present invention is to reliably detect a belt to form a base tire having a desired shape and dimensions even in a case where a belt layer or a belt reinforcing layer is made of a non-metal material. Specifically, the present invention provides a method of producing a retread tire by grinding and removing by a grinding means tread rubber of a used tire including a belt layer, the tread rubber being disposed on the outer side in the radial direction of the belt layer, comprising the steps of: measuring hardness of the tread rubber by a hardness measuring means; and completing grinding of the tread rubber by the grinding means when hardness of the tread rubber measured by the hardness measuring means has reached a predetermined hardness.

8 Claims, 2 Drawing Sheets

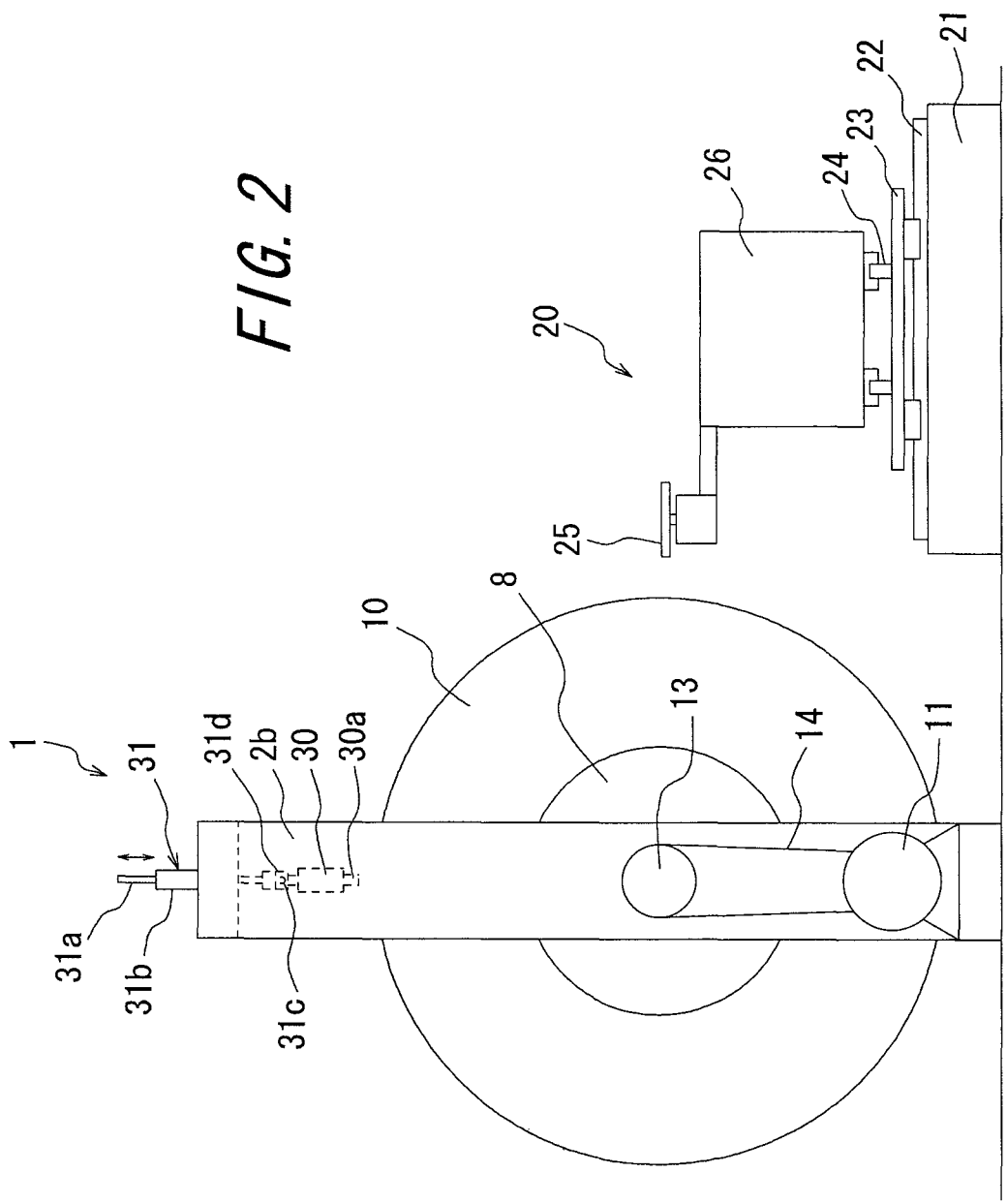

METHOD OF PRODUCING RETREAD TIRE AND GRINDING APPARATUS FOR USED TIRE

TECHNICAL FIELD

The present inventions relates to a method of producing a retread tire and an apparatus for grinding a used tire. Specifically, the present invention relates to realizing easy and reliable grinding of tread rubber of a used tire.

PRIOR ART

A tire for an automobile is produced by attaching on a base tire tread rubber which is to be brought into contact with the ground. Since a base tire is often still in a good condition sufficient to serve for further use when the tread rubber attached thereon has finished its product life, a tread rubber portion which has been worn due to use may be recapped with new rubber or retread tire materials so that the tire can be used again as a retread tire. Production of a retread tire is generally classified into two types: re-mold method (hot retreading) of attaching tread rubber which has not been patterned on a base tire and setting this semi-finished product in a mold for vulcanization and patterning; and pre-cure method (cold retreading) of attaching tread rubber which has already been vulcanized and patterned on a base tire, without using a mold, and subjecting the semi-finished product to further vulcanization in a vulcanization drum. In either of these two retreading methods, it is necessary to first shape a used tire to be retreaded to a predetermined configuration and dimensions in a buffing process using a buff machine, to obtain a base tire.

Conventionally, a base tire is obtained by: first boring at least one hole in tread rubber of a used tire by using a drill or the like until the hole reaches a belt layer; manually measuring the depth of each hole by using a scale or the like; determining an amount of grinding, i.e. an amount to be ground, for the used tire based on the measured value; and semi-automatically or full-automatically grinding the tread rubber by the amount of grinding by using a grinding means, for removal, to form a base tire. However, in a case where a base tire is formed in such a manner as described above, there arises a problem that the process is time-consuming and not reliable when the number of measurement points is relatively small because thickness of tread rubber of a used tire is manually measured in determining an amount of grinding for the used tire.

In order to address the problem described above, for example, JP 58-001546 Laid-Open and JP 2002-086586 Laid-Open each disclose a grinding apparatus which enables automatically controlling a grinding amount of tread rubber for a used tire such that thickness of the tread rubber on a base tire is set at the optimum value by measuring thickness of the tread rubber of the used tire by using a metal detection sensor or an Eddy current sensor, without breaking the tire. The grinding apparatus of JP 58-001546 measures thickness of tread rubber in a used tire by detecting a belt layer of the used tire by using a metal sensor, while the used tire rotatably held by a retaining mechanism is being rotated; grinds and removes the outer peripheral surface of the used tire by a grinding means based on the measured thickness of the tread rubber; and stops grinding by the grinding means when thickness of the tread rubber reaches the optimum value. The apparatus of JP 2002-086586 employs an Eddy current sensor in place of the aforementioned metal sensor; measures a distance between the sensor and a belt layer by utilizing an electromagnetic induction effects of a high frequency coil of the Eddy current sensor disposed close to the outer peripheral surface of the used tire; calculates thickness of tread rubber in a used tire, grinds and removes the outer peripheral surface of the used tire by a grinding means based on the measured thickness of the tread rubber; and stops grinding by the grinding means when thickness of the tread rubber reaches the optimum value.

DISCLOSURE OF THE INVENTION

Problems to be Solved by the Invention

However, the grinding apparatuses disclosed in JP 58-001546 and JP 2002-086586 cannot measure thickness of tread rubber in a case where a belt cord constituting a belt layer is formed by a non-metal material such as polyester, glass fiber and the like because a metal detection sensor or an Eddy current sensor is used for measurement of thickness of tread rubber of a used tire. Further, these grinding apparatus cannot detect existence of a belt reinforcing layer for the same reasons as described above and thus may grind the belt reinforcing layer together with tread rubber when the tread rubber is ground, in a case where a belt reinforcing layer, formed by winding a belt-shaped organic fiber like nylon in the circumferential direction, is embedded on the outer side in the radial direction of a belt layer constituted of steel cords to suppress increase in radial diameter of a tire when the tire runs at a relatively high speed, to adapt to high speed running.

Accordingly, the present invention aims at solving the problems described above, and an object thereof is to reliably detect a belt layer of a used tire and form a base tire of desired shape and dimensions in a case where the belt layer is formed by a non-metal material and a case where a belt reinforcing layer formed by a non-metal material is embedded on the outer side in the radial direction of the belt layer, as well as in a case where the belt layer is constituted of cords made of a metal material.

Means for Solving the Problems

In order to achieve the object described above, in a first aspect of the present invention, a method of producing a retread tire by grinding and removing by a grinding means tread rubber of a used tire including a belt layer, the tread rubber being disposed on the outer side in the radial direction of the belt layer, comprises the steps of:

measuring hardness of the tread rubber by a hardness measuring means; and completing grinding of the tread rubber by the grinding means when hardness of the tread rubber measured by the hardness measuring means has reached a predetermined hardness.

In the present invention, the term "belt layer" may represent not only a belt disposed on the outer side in the radial direction of a carcass but also what is called a belt reinforcing layer embedded on the outer side in the radial direction of the belt for reinforcing the belt. Further, " predetermined hardness" may be set based on hardness data specified in advance for each tire structure. More specifically, "predetermined hardness" may be set based on data storing tire size, the number of belts, the number of belt reinforcing layers, and the like.

According to a method of grinding a used tire, of the present invention, a predetermined hardness within a range between the hardness of a belt layer and the hardness of tread rubber prior to being ground is selected in advance, and the tread rubber of the used tire is ground by a grinding means until hardness of the tread rubber measured by a hardness measuring means reaches the predetermined hardness, whereby a base tire having a desired thickness (i.e. a desired distance measured from the outermost surface of the belt layer up to the outer peripheral surface of the tread rubber) of tread rubber can be formed. This is possible because there is observed a certain correlational relationship between hardness of tread rubber and thickness thereof after being ground, which relationship may depend on material characteristics and structural characteristics of the tread rubber and the belt layer, the state of degradation of the tire, and the like. Hardness of a belt layer is generally larger than hardness of tread rubber prior to being ground. Accordingly, the smaller the thickness of tread rubber is, due to grinding, i.e. the closer the outer peripheral surface of the tread rubber is to the outermost surface of a belt, the larger hardness of the remaining tread rubber is resulted.

Therefore, according to the method of grinding a used tire, of the present invention, since a belt layer is detected utilizing hardness of the belt layer in a manner different from the conventional technique of detecting a belt layer by using a metal detection sensor or an Eddy current sensor, a belt layer of a used tire can be reliably detected, for example, in a case where the belt layer is constituted of cords made of a non-metal material such as organic fibers and a case where a belt reinforcing layer constituted of cords of a non-metal material such as organic fibers is embedded on the outer side in the radial direction of the belt layer.

In order to achieve the object described above, in a second aspect of the present invention, a grinding apparatus for a used tire including a belt layer, the apparatus being adapted to grind and remove tread rubber disposed on the outer side in the radial direction of the belt layer to form a base tire for a retread tire, comprises:

grinding means for grinding the tread rubber;

hardness measuring means for measuring hardness of the tread rubber;

control means for controlling the grinding apparatus, wherein the control means is adapted to stop grinding by the grinding means when hardness of the tread rubber measured by the hardness measuring means has reached a predetermined hardness.

In the grinding apparatus for a used tire as described above, a belt layer can be detected by measuring, by the harness measuring means, hardness of tread rubber of a used tire to be served for grinding. That is, a base tire having a desired thickness of tread rubber is formed by grinding the tread rubber by the grinding means until hardness of the tread rubber of the used tire reaches a predetermined hardness specified in advance.

Therefore, according to the grinding apparatus for a used tire, of the present invention, since a belt layer is detected utilizing hardness of the belt layer in a manner different from the conventional technique of detecting a belt layer by using a metal detection sensor or an Eddy current sensor, a belt layer of a used tire can be reliably detected, for example, in a case where the belt layer is constituted of cords made of a non-metal material such as organic fibers and a case where a belt reinforcing layer constituted of cords of a non-metal material such as organic fibers is embedded on the outer side in the radial direction of the belt layer.

In the first and second aspects of the present invention, an amount of grinding of tread rubber is preferably controlled such that the grinding amount is inversely proportional to a magnitude of hardness of the tread rubber measured by the hardness measuring means.

Further, it is preferable that grinding of the tread rubber and measurement of hardness of the tread rubber is carried out in alternate and repeated manner.

Effect of the Invention

According to the grinding method and a grinding apparatus for a used tire, of the present invention, a belt layer of a used tire can be reliably detected in a case where the belt layer is formed by a non-metal material and a case where a belt reinforcing layer formed by a non-metal material is embedded on the outer side in the radial direction of the belt layer, as well as in a case where the belt layer is constituted of cords made of a metal material. As a result, a base tire having a desired shape and dimensions can be obtained.

BRIEF DESCRIPTION OF THE DRAWINGS

FIG. 2 is a side view of the grinding apparatus of FIG. 1.

BEST MODE FOR IMPLEMENTING THE INVENTION

Figure 1:
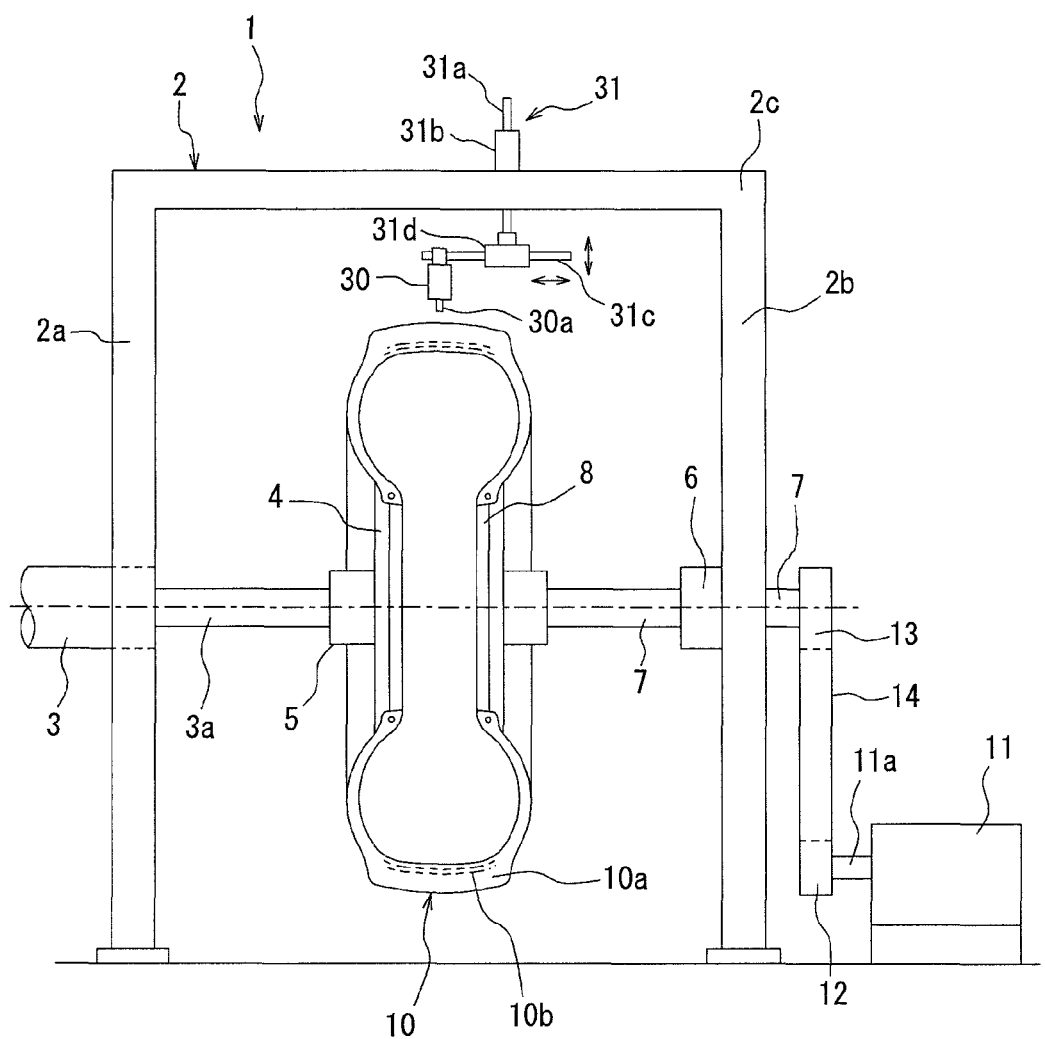
FIG. 1 is a front view of a grinding apparatus for a used tire according to an embodiment of the present invention.

A grinding apparatus for a used tire and a method of producing a retread tire by using the apparatus according to an embodiment of the present invention will be described with reference to the drawings hereinafter. FIG. 1 is a front view of a grinding apparatus for a used tire (which will be referred to simply as a "tire" hereinafter) according to the present embodiment of the invention. FIG. 2 is a side view of the grinding apparatus of FIG. 1.

As shown in FIG. 1, a gate-shaped support frame 2 is provided to stand on a floor surface. A cylinder 3 is mounted on the support frame 2 such that the cylinder 3 horizontally extends from the middle portion in the height direction (the vertical direction in FIG. 1) of a vertical portion 2a positioned at one side of the support frame 2 toward the vertical portion 2b positioned at the other side of the support frame 2. The rear end in the axial direction of a piston rod 3a of the cylinder 3 is inserted into a bearing 5 fixed on one side face of a support rim 4 positioned at one side of a tire, whereby the support rim 4 is rotatably supported by the support frame 2 by way of the bearing 5 and the cylinder 3.

On the other hand, a bearing 6 is fixed at the middle portion in the height direction (the vertical direction in FIG. 1) of one side face of the vertical portion 2b. A rotating shaft 7 is inserted into the bearing 6 such that the rotating shaft 7 is rotatable around the same axis as the cylinder 3. A support rim 8 positioned at the other side of the tire, paired with the support rim 4, is fixed at one axial end of the rotating shaft 7. As a result, the support rim 8 is rotatably supported by the support frame 2 by way of the bearing 6 and the rotating shaft 7.

Only the support rim 4 is moved in the axial direction of the cylinder 3, while the support rim 8 remains fixed at the same position, by projection/retraction of the piston rod 3a through operation of the cylinder 3, whereby the paired support rims 4, 8 approach/are separated from each other along the center axis line of a tire 10 described below. The manner of making the support rims 4, 8 approach/be separated from each other is not limited to making only one of them (i.e. the support rim 4) move as in the present embodiment, and the support rims 4, 8 may be moved together. That is, at least one of the support rims 4, 8 is moved to approach/be separated from each other along the center axis of the tire.

A driving motor 11 is provided on the floor surface at the opposite side of the vertical portion 2b viewed from the support rims 4, 8. A driving belt 14 is suspended between a pulley 12 fixed on an output shaft 11a of the driving motor 11 and a pulley 13 fixed on the rotating shaft 7. Accordingly, in a grinding and removing operation of tread rubber 10a of the tire 10, when the output shaft 11a is rotated through operation of the driving motor 11, the support rims 4, 8 and the tire fixed thereto are integrally rotated around the center axis of the tire 10.

As shown in FIG. 2, a grinding means 20 for grinding the tread rubber 10a of the tire 10 is provided at the front (at the right-hand side in FIG. 2) of the support frame 2. The grinding means 20 includes a base 21 disposed on the floor surface and a pair of guide rails 22 extending in the front-rear direction (the left-right hand side direction in FIG. 2) mounted on the base 21. A moving plate 23 is slidably supported on the guide rails 22. Further, a pair of guide rails 24 extending in parallel with the axial direction of the rotating shaft 7 are mounted on the moving plate 23. A carriage 26 having a buff rotating body (rasp) 25 for grinding the tread rubber 10a of the tire 10 is slidably supported on the guide rails 24. The moving plate 23 and the carriage 26 move in the radial and/or the widthwise direction of the tire 10, respectively, by being driven by a driving mechanism (not shown) such as a screw mechanism, whereby the carriage 26 and thus the buff rotating body 25 can move along the outer peripheral surface of the tire 10 in a horizontal plane.

Accordingly, a portion or the entire portion of the tread rubber 10a are ground and removed from the tire 10 and the tire 10 is shaped to a base tire by moving the buff rotating body 25, which is being rotated, along the outer peripheral surface of the tire 10 in a horizontal plane in a state where the tire 10 supported by the support rims 4, 8 is being rotated by a driving force from the driving motor 11. The base 21, the guide rails 22, 24, the moving plate 23, the carriage 26 and the buff rotating body 25 as a whole constitute the grinding means 20. The grinding means may, however, have a structure other than that described above.

Further, a durometer 30 as a hardness measuring means is provided at a horizontal portion 2c extending across the pair of the horizontal portions 2a, 2b of the support frame 2 via, for example, a position adjusting mechanism 31 for adjusting a position of the durometer 30 with respect to the tread rubber 10a of the tire 10, as shown in FIGS. 1 and 2. For example, the position adjusting mechanism 31 may be constituted of, as shown in the drawings, a longitudinal arm member 31a penetrating through the horizontal portion 2c in the vertical direction (the up-down direction in FIG. 2); a vertical slide motor 31b fixed on the horizontal portion 2c for holding the longitudinal arm member 31a such that the longitudinal arm member 31 is slidable in the vertical direction; and a horizontal slide motor 31d fixed at one end of the longitudinal arm member 31a for holding a lateral arm member 31c such that the lateral arm member 31c, positioned to extend in parallel with the axial direction (the widthwise direction of the tire 10) of the rotating shaft 7, is movable in the axial direction of the rotating shaft 7. Accordingly, the durometer 30 is moved in the radial direction and/or the widthwise direction of the tire 10 by driving force from the vertical slide motor 31b and/or the horizontal slide motor 31d via the longitudinal arm member 31a and the lateral arm member 31c.

The durometer 30 measures hardness of the outer peripheral surface of the tread rubber 10a of the tire 10 based on a magnitude of displacement of a pushing needle 30a provided at the lower portion of the duromenter 30. The measurement result is outputted to a control circuit (not shown) as a control means for controlling the grinding apparatus.

The control circuit completes grinding of the tread rubber 10a by the grinding means 20 when the hardness of the tread rubber 10a of the tire 10 measured by the durometer 30 has reached a predetermined hardness. In the present embodiment, for example, the hardness of a belt layer 10b of the tire 10 may be inputted in advance in the control circuit so that the operation of the grinding means 20 can be appropriately controlled based on this information. In the present embodiment, "a predetermined hardness" may be set as a value between the hardness of the belt layer 10b and the hardness of the tread rubber 10a prior to being ground.

The control circuit calculates a grinding amount of the tread rubber 10a based on the hardness thereof measured by the durometer 30. In the present embodiment, the grinding amount of the tread rubber 10a is controllably set to be inversely proportional to the magnitude of hardness of the tread rubber 10a measured by the durometer 30. Specifically, a grinding amount of the tread rubber 10a is set larger than a predetermined standard value when the hardness of the tread rubber 10a measured by the durometer 30 is closer to the hardness of the tread rubber 10a prior to being ground than the aforementioned predetermined hardness. In contrast, a grinding amount of the tread rubber 10a is set smaller than the predetermined standard value when the hardness of the tread rubber 10a measured by the durometer 30 is closer to the aforementioned predetermined hardness than the hardness of the tread rubber 10a prior to being ground. The control circuit appropriately controls the operation of the grinding means 20 based on the grinding amount thus determined. Specifically, the driving mechanism (not shown) of the grinding means 20 moves the moving plate 23 and the carriage 26 in the radial and/or the widthwise direction of the tire 10 by a distance corresponding to the grinding amount thus determined, so that the tread rubber 10a of the tire 10 is ground by the grinding amount. Further, the control circuit controls the grinding apparatus 1 so that grinding of the tread rubber 10a and measurement of hardness thereof are carried out in alternate and repeated manner.

Next, an operation of the grinding apparatus 1 for a used tire described above will be described. First, the tire 10 is mounted on the support rims 4, 8 and a pressure is exerted against the tread rubber 10a from the inside thereof by, for example, inflating the tire at a predetermined air pressure. Next, the tire 10 is rotated and fixed at a desired position. The arm members 31a, 31c of the position adjusting mechanism 31 are then slid according to instructions from the control circuit, to determine a hardness measuring position at the outer peripheral surface of the tread rubber 10a of the tire 10. The pressing needle 30a of the durometer 30 is pressed against the outer peripheral surface at the hardness measuring position under a constant load. As a result, the pressing needle 30a is displaced in accordance with hardness of the tread rubber 10a. The durometer 30 measures the hardness of the tread rubber 10a based on a magnitude of displacement of the pressing needle 30a and outputs the measurement result to the control circuit. The control circuit determines a grinding amount of the tread rubber 10a of the tire 10 based on this measurement result.

Next, the support rims 4, 8 and the tire 10 are integrally rotated by the driving motor 11. At the same time the control circuit, based on the grinding amount thus determined, moves the moving plate 23 and the carriage 26 waiting at respective standby positions along the guide rails 22, 24 toward the tire 10, rotates the buff rotating body 25 at a high speed, brings the buff rotating body 25 into contact with the tread rubber 10a of the tire 10, and moves the buff rotating body 25 together with the carriage 26 along the outer peripheral surface of the tire 10, whereby a portion or the entire portion of the tread rubber 10a of the tire 10 is ground and removed. Hardness of the tread rubber 10a of the tread 10 is then measured again by the durometer 30. Grinding is completed in a case where the hardness of the tread rubber 10a has reached the predetermined hardness inputted in the control circuit in advance. In a case where the hardness of the tread rubber 10a has not reached the predetermined hardness, a grinding amount of the tread rubber 10a of the tire 10 is again determined by the control circuit based on the measurement result of hardness of the tread rubber 10a. Thereafter, the tread rubber 10a of the tire 10 is ground based on the grinding amount thus redetermined, as in the previous grinding. The hardness measuring operation and the grinding operation of the tread rubber 10a are carried out in alternate and repeated manner until hardness of the tread rubber 10a reaches the predetermined hardness. Thickness of tread rubber is at the optimum value thereof when hardness of the tread rubber 10a has reached the predetermined hardness.

In the present embodiment, Table 1 below specifically shows the results of hardness of tread rubber measured by a durometer and remaining thickness of tread rubber at respective stages when the tread rubber of a used tire is ground stepwise by a grinding means.

TABLE 1

| Amount of tread rubber which has been ground | Hardness of tread rubber | Thickness of remaining tread rubber |
|---|---|---|
| 1 mm | 28 degrees | 5 mm |
| 2 mm | 35 degrees | 4 mm |
| 3 mm | 50 degrees | 3 mm |
| 5 mm | 80 degrees | 1 mm |

In the grinding apparatus 11 for a used tire of the present embodiment, the belt layer 10b is detected by measuring by the durometer 30 hardness of the tread rubber 10a of the used tire 10 to be ground. A base tire having a desired thickness of the tread rubber 10a is formed by grinding the tread rubber 10a of the used tire 10 by the grinding means 20 until hardness of the tread rubber 10a of the used tire 10 reaches the predetermined hardness value within a range between the hardness value of the belt layer 10b and the hardness value of the tread rubber 10a prior to being ground, which hardness values are determined in advance. A "predetermined hardness" as the hardness at which grinding is to be completed may be set and stored in advance for each tire type, i.e. each tire structure (which varies depending on the number of belts, a pry material, a material of tread rubber, the number of belt reinforce layers, tire size, and the like).

Therefore, according to the grinding apparatus 1 for a used tire 10, of the present embodiment, since a belt layer 10b is detected utilizing on hardness of the belt layer in a manner different from the conventional technique of detecting the belt layer 10b by using a metal detection sensor or an Eddy current sensor, the belt layer 10b of the used tire 10 can be reliably detected, for example, in a case where the belt layer 10b is constituted of cords made of a non-metal material such as organic fibers and a case where a belt reinforcing layer constituted of cords of a non-metal material such as organic fibers is embedded on the outer side in the radial direction of the belt layer 10b.

Further, according to the grinding apparatus 1 for a used tire 10 of the present embodiment, a grinding amount of the tread rubber 10a is controlled to be inversely proportional to a magnitude of hardness of the tread rubber 10a measured by the hardness measuring means. A grinding amount is thus set relatively large at a position relatively remote from the outermost layer surface of the belt layer 10b where precision in grinding is not so strictly required, while a grinding amount is set relatively small at a position relatively close to the outermost layer surface of the belt layer 10b where highly precise grinding is required. Accordingly, highly precise grinding of the tread rubber 10a in a shorter grinding time is possible.

Yet further, according to the grinding apparatus 1 for a used tire 10 of the present embodiment, grinding of the tread rubber 10a and measurement of hardness of the tread rubber 10a are carried out in alternate and repeated manner, whereby highly precise detection of the belt layer 10b is possible.

The foregoing descriptions merely show a part of an embodiment of the present invention, and the structures described above may be combined with each other and/or various modifications may be added thereto unless such combinations/modifications digress from the spirit of the present invention. For example, although hardness of the tread rubber 10a is intermittently measured by bringing the pressing needle 31 of the durometer 30 into contact with the outer peripheral surface of the tread rubber 10a at each completion of grinding of the tread rubber 10a by the grinding means 20 in the aforementioned embodiment, the present invention is not limited thereto and it is acceptable to continually measure hardness of the tread rubber 10a, while simultaneously grinding the tread rubber 10a.

Industrial Applicability

As is obvious from the descriptions described above, according to the present invention, a belt layer of a used tire can be reliably detected in a case where the belt layer is made of a non-metal material and a case where a belt reinforcing layer made of a non-metal material is embedded on the outer side in the radial direction of the belt layer, as well as a case where the belt layer is constituted of cords made of a metal material. As a result, it is possible to form a base tire having a desired shape and dimensions.

The invention claimed is:

1. A method of producing a retread tire by grinding and removing by a grinding means tread rubber of a used tire including a belt layer, the tread rubber being disposed on the outer side in the radial direction of the belt layer, comprising the steps of:
    measuring hardness of the tread rubber by a hardness measuring means; and
    completing grinding of the tread rubber by the grinding means when hardness of the tread rubber measured by the hardness measuring means has reached a predetermined hardness.

2. The method of producing a retread tire of claim 1, wherein the predetermined hardness is set based on information regarding a tire structure of a tire to be retreaded.

3. The method of producing a retread tire of claim 1, wherein an amount of grinding of tread rubber is controlled such that the grinding amount is inversely proportional to a magnitude of hardness of the tread rubber measured by the hardness measuring means.

4. The method of producing a retread tire of claim 1, wherein grinding of the tread rubber and measurement of hardness of the tread rubber is carried out in alternate and repeated manner.

5. A grinding apparatus for a used tire including a belt layer, the apparatus being adapted to grind and remove tread rubber disposed on the outer side in the radial direction of the belt layer to form a base tire for a retread tire, comprises:
    grinding means for grinding the tread rubber;

hardness measuring means for measuring hardness of the tread rubber;

control means for controlling the grinding apparatus, wherein the control means is adapted to stop grinding by the grinding means when hardness of the tread rubber measured by the hardness measuring means has reached a predetermined hardness.

6. The grinding apparatus for a used tire of claim 5, wherein the predetermined hardness is set according to data based on pre-stored information regarding a tire structure of a tire to be retreaded.

7. The grinding apparatus for a used tire of claim 5, wherein the control means is adapted to control an amount of grinding of tread rubber such that the grinding amount is inversely proportional to a magnitude of hardness of the tread rubber measured by the hardness measuring means.

8. The grinding apparatus for a used tire of claim 5, wherein the control means is adapted to carry out grinding of the tread rubber and measurement of hardness of the tread rubber in alternate and repeated manner.

* * * * *